Figure 1:
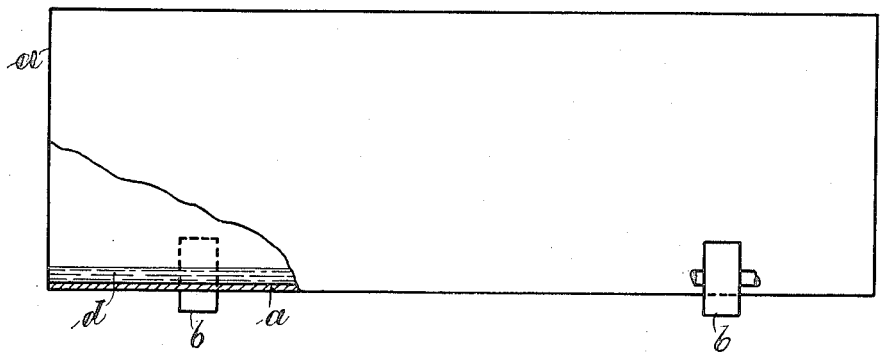

H. HELD.
PROCESS OF TREATING LARGE FERMENTATION VESSELS.
APPLICATION FILED FEB. 6, 1912.

1,076,424. Patented Oct. 21, 1913.

UNITED STATES PATENT OFFICE.

HANS HELD, OF NUREMBERG, GERMANY.

PROCESS OF TREATING LARGE FERMENTATION VESSELS.

1,076,424.　　　　　　Specification of Letters Patent.　　Patented Oct. 21, 1913.

Continuation of application Serial No. 524,045, filed October 22, 1909. This application filed February 6, 1912. Serial No. 676,115.

*To all whom it may concern:*

Be it known that I, HANS HELD, Ph. D., a citizen of the Empire of Germany, and a resident of Nuremberg, in the Empire of Germany, have invented certain new and useful Improvements in Processes of Treating Large Fermentation Vessels, of which the following is a specification.

This invention has reference to improvements in producing large vessels for pure alcoholic fermentations of saccharine liquids.

This application is a continuation of my application for Letters Patent of the U. S. for preparation of vessels for preparing pure alcoholic fermentations of saccharine liquids filed October 22, 1909 under Ser. No. 524,045.

The vessels heretofore employed in zymotechnic industries for alcoholic fermentations of saccharine liquids were made from wood, glass, stone, cement or iron. In some instances a separate vessel of non-corrodible material such as silver, was placed into an outer vessel or two metallic vessels were separated by hard rubber or other material which does not conduct electricity. Enamel lined and silver plated metal vessels were also used in pasteurizing liquids.

All the described vessels present certain defects in their use or are not desirable for other reasons. The wooden vessels lined with pitch, lacquer, paraffin or the like always have unavoidable cracks, flaws or pores through which the saccharine or the fermented liquid can penetrate into the wood. Glass, stone or enameled vessels easily get cracks by unequal expansion and contraction or in consequence of one sided pressure. Stone and cement vessels must be lined with heavy layers of neutral material which often breaks off by irregular drying or from other causes and such coatings are also liable to get cracks. Likewise iron vessels made from curved plates coated with pitch or the like or enameled share the same defects and large vessels of iron made of curved plates and connected by rivets or screws always form breeding places on the joints for infecting the alcoholic fermentation. The described defects invariably occur even if cracks and the like in such vessels are only microscopically small, yet these fine cracks permit of the settlement of fermentation fungi after the vessels have been emptied and even in spite of thorough cleaning these fungi will then undergo either self fermentation or putrefaction and after the refilling of the vessels with saccharine liquid will cause secondary fermentations and produce not alone ethylic alcohol but a series of other substances such as alcohols of the higher orders, organic acids, esters and the like.

The present invention has for its object improvements in the art of making fermentation vessels by means of which perfectly pure fermentations of saccharine liquids are obtained and any detrimental secondary fermentations and their resulting undesirable products are avoided.

The invention is diagrammatically illustrated in the accompanying drawing in which—

Figure 2:
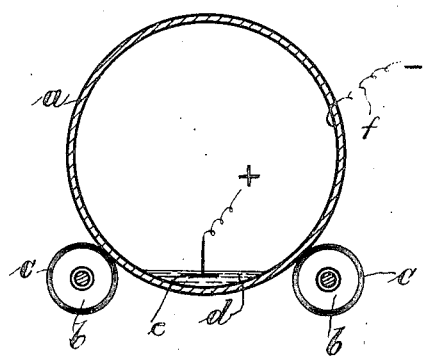

Figure 1 represents in side elevation, partly broken away a large vessel for pure alcoholic fermentations of saccharine liquids resting on rollers for the purpose of coating its interior surface. Fig. 2 is a cross section of same.

Similar letters of reference denote like parts in both figures.

In the drawing $a$ represents a large fermentation vessel in a horizontal position. The vessel $a$ rests on rollers $b$ so that it may be conveniently turned for a certain distance when desired during the process of coating its interior surface. The rollers $b$ are provided with suitable insulation $c$ so as to prevent any electrical connection between the vessel or tank $a$ and the rollers. Assuming that the vessel is in the position indicated on the drawing some of the electrolyte $d$ is placed therein with the anode $e$ while the inner surface of the vessel forms the cathode $f$. By rotating the vessel on its axis the inner surface thereof can be electroplated with a film of non-corrodible metal.

It is essential in this art that the cost of production of fermentation vessels be kept as low as possible with the use of the most desirable material particularly when large vessels are required such as form the subject matter of this invention which can not be completed in the factory on account of the size but must be mounted and finished at the place where they are used. According to this invention very large vessels may be made relatively cheap as compared with vessels made according to known methods.

In carrying the present invention into effect with a view of accomplishing the above desirable results I preferably proceed as follows: First the parts of the large vessel are constructed at the factory, then these parts are put up at the place where the vessel is to be used. The single parts may be connected by riveting, soldering, or welding. The finished vessel is now lined with copper by chemical process or electro-plating. Such large vessel cannot be placed into an electrolytic bath on account of its size and even if this could be done the large quantity of liquid required for the coating of the inside would make this method too expensive. The coating of the new large vessels is effected by placing some electrolyte with the anode into the vessel and making the inner surface of the vessel the cathode while rotating the vessel, preferably on insulated rollers around its horizontally arranged longitudinal axis. In this way a very durable vessel is obtained with a thin coating on the inside of precious metal such as silver or gold or an alloy of both which coating may be produced in the manner described at a reasonable cost. It is self evident that an iron vessel even if nicely finished on the inside will not take a coating of precious metal in such a perfect manner as well as a copper lined vessel, the copper being of an exceedingly fine finish even at the joints, when such vessel is made up of several parts. To further reduce the cost of construction of large vessels the same may be made of a base metal and coated on the inside with copper by chemical process or electro-plating and a coat of precious metal such as silver or gold or an alloy of both produced on the copper deposit, thus but very little copper is used and still the precious metal coating will perfectly adhere to the copper coating. Both open and closed vessels may be constructed in the prescribed manner.

I claim as my invention:

1. In the production of large vessels suitable for use in fermenting saccharine liquids, the process which comprises forming the vessel of a cheap metal, placing an amount of electrolyte therein, which amount is materially less than the amount required to fill said vessel, rotating the vessel about its longitudinal, horizontally arranged axis while passing an electric current through said electrolyte, and making the inner wall of said vessel serve as the cathode, thus producing a coating of a metal on the inner surface of said vessel.

2. The improvement in the art of producing large vessels, which comprises insulating said vessel, placing an amount of a copper electrolyte therein insufficient to fill said vessel, together with an anode, connecting the vessel itself as the cathode, passing an electric current through the electrolyte from said anode to said vessel; rotating said vessel containing the electrolyte, and thereafter producing in like manner a second coating of a different metal.

3. The improvement in the art of producing large vessels, which comprises insulating said vessel, placing an amount of a copper electrolyte therein insufficient to fill said vessel, together with an anode, connecting the vessel itself as the cathode, passing an electric current through the electrolyte from said anode to said vessel; rotating said vessel containing the electrolyte, and thereafter producing in like manner a second coating of silver.

4. In the production of large, silver lined vessels suitable for use in fermenting saccharine liquids, the improvement consisting in placing within such vessel an amount of an electrolyte containing copper, said amount being insufficient to fill said vessel, and placing an anode within said vessel, rotating said vessel about its horizontal axis and passing an electric current through said electrolyte, from said anode to the inner wall of said vessel to electrodeposit copper thereon, and thereafter producing in like manner a second coating of silver thereupon.

Signed at Nuremberg, Germany, this 17th day of January 1912.

HANS HELD.

Witnesses:
RALPH W. DOX,
GEORGE NICOLAS IFFT.